United States Patent [19]

Busch

[11] 4,225,943
[45] Sep. 30, 1980

[54] DISPLAY SYSTEM FOR HORIZONTALLY SEGMENTING TEXT

[75] Inventor: Dennis G. Busch, Austin, Tex.

[73] Assignee: International Business Machines Corporation, Armonk, N.Y.

[21] Appl. No.: 2,529

[22] Filed: Jan. 11, 1979

Related U.S. Application Data

[63] Continuation of Ser. No. 762,377, Jan. 25, 1977, abandoned.

[51] Int. Cl.$^3$ .............................................. G06F 3/14
[52] U.S. Cl. ................................................ 364/900
[58] Field of Search ... 364/200 MS File, 900 MS File

[56] References Cited

U.S. PATENT DOCUMENTS 4,054,948 10/1977 Grier et al. ......................... 364/900

*Primary Examiner*—Gareth D. Shaw
*Assistant Examiner*—C. T. Bartz
*Attorney, Agent, or Firm*—James H. Barksdale, Jr.

[57] ABSTRACT

A display system for horizontally segmenting text made up of varying width characters and spaces. When a text measure is wider than the width of a display device, only a portion of the text can be displayed at one time. By dividing the text into segments, all of the text can be ultimately displayed. This is done automatically dependent upon the current location of a cursor positioned within one of the lines of the text. Entire lines of text, including a scale line, are sequentially loaded into a line buffer beginning with the line containing the cursor. A segment of the line containing the cursor is determined and displayed, and then corresponding segments of subsequent lines are determined and displayed. Thereafter, a corresponding segment of the scale line is determined and displayed. The display includes only whole characters adjacent its left edge.

16 Claims, 11 Drawing Figures

SEGMENT 1

SEGMENT 2

SEGMENT 3

OVERALL SYSTEM

DISPLAY CONTROL LOGIC

DISPLAY CONTROL LOGIC

LINE MOVE LOGIC

DISPLAY SYSTEM FOR HORIZONTALLY SEGMENTING TEXT

This is a continuation of application Ser. No. 762,377 filed Jan. 25, 1977, now abandoned.

BACKGROUND OF THE INVENTION

1. Field of the Invention

This invention generally relates to automatic systems for horizontally segmenting lines of text and then displaying the line segments. More specifically, this invention relates to a proportional spacing system which effects the display of line segments based upon the location of a cursor and beginning with whole characters.

2. Description of the Prior Art

The scrolling of text up and down in a vertical direction on the face of a display device has been known and used for some time. Also, the automatic scrolling or segmenting of text and other information in the horizontal direction is considered old. Considered new as far as this invention is concerned is a horizontal segmenting display system which can be used for efficiently handling text and other information made up of standard and proportional width characters. As far as the display of text made up on only standard width characters is concerned, no unsurmountable problems have been encountered. This is because the characters and spaces adjacent the left edge of a display segment will always be vertically aligned. When text made up of proportional width characters is considered though, a problem exists in generating partial characters to effect proper relative placement in the vertical direction. Up to now, there has been no known economical way to handle partial characters adjacent the left edge of the display. This problem is solved with the system of this invention in that partial characters are replaced with equivalent width spaces. The resultant is a ragged left edge, but the characters are aligned vertically as they would be printed. Also, the system of this invention is structured such that both proportional and standard width characters can be readily handled. With this being the case, a scale line made up of standard width characters and symbols can be displayed along with text made up of proportional width characters. Therefore, the display of a corresponding segment of the scale line in standard width characters and symbols will provide an operator with a page location reference means equivalent to a standard typewriter scale.

SUMMARY OF THE INVENTION

A system is provided which effects the automatic segmentation of both text lines and a scale line which are to be displayed. Segmentation is dependent upon the location of a cursor in one of the lines of the text. The system is structured to handle both standard and proportional width characters. Each line, beginning with the line containing the cursor, is sequentially loaded into a line buffer. Following the loading of the first line, a segment including the cursor is selected. This segment is loaded into a refresh buffer for display. Then the corresponding segment of each following line, including the scale line, is selected and loaded into the refresh buffer for display. Upon repositioning of the cursor beyond either the left or right edge of the display, the above operation is repeated beginning with the loading of the cursor line into the line buffer. The occurrence of a partial character adjacent the left edge of a segment will result in a space fill-in for display.

BRIEF DESCRIPTION OF THE DRAWING

FIG. 2b is a pictorial representation of a display of another horizontal segment of the text shown in FIG. 1 partially overlapping the first segment shown in FIG. 2a.

DESCRIPTION OF THE PREFERRED EMBODIMENT

Operations to be Performed

For a clearer understanding of the invention, the operations to be performed will be discussed first. In referring to FIG. 1 there is shown a partial page of text made up of vertically defined lines of information. It is to be assumed that this page of text is stored in a text buffer. Stored in the text buffer along with the alpha-/numeric characters and spaces shown are the cursor, the mode, the measure, and appropriate control codes. The measure is the distance between left and right margins for the text. The measure can be stored in terms of the locations of the left and right margins relative to a zero writing line position. In this preferred embodiment the left and right margins vertically define the text information. The zero writing line position is the left most printing position on a printer being used. The location of the cursor is the point of operation for editing purposes. The cursor has been shown as the highlighted and underlined "O" in the word OF in the first line. This is for purposes of illustration only. In actuality it will only be a high-lighted character created by a brightening bit in the character byte. For example, if 8 bits make up the character byte, seven can be used for the character itself and one for brightening in a well known manner. The setting of the mode can be in terms of designating proportional spacing or 10 or 12 pitch standard spacing. When the term proportional spacing is used hereinafter, it is meant to include escapement for proportional or varying width characters, spaces, etc. The term standard spacing is meant to include escapement for standard or equivalent width characters, spaced, etc. The control codes utilized can be many including carrier return or line end codes, tabs, etc.

Figure 1:
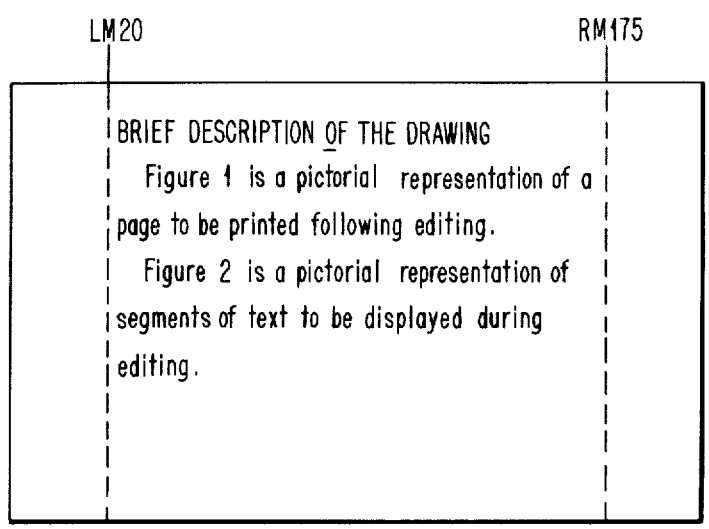
FIG. 1 is a pictorial representation of a partial page of stored text which is to be displayed, edited, and printed on a sheet.

Another assumption to be made is that the text illustrated in FIG. 1 is to ultimately be printed out on a sheet following editing. If this text has a measure width exceeding the width of the display device being utilized, the display of the text for editing purposes must be in segments. That is, the text must be horizontally scrolled.

Figure 2A:
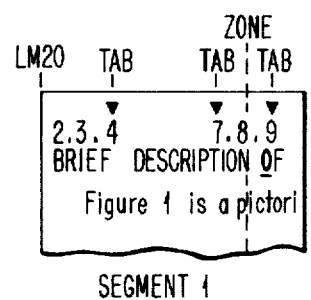
FIG. 2a is a pictorial representation of a display of a horizontal segment of the text shown in FIG. 1.

For efficient utilization of the display device, the display of the first segment will begin at the left edge of the display. Therefore, the left margin space between the left edge of the sheet and the left margin will not be displayed. This is illustrated in FIG. 2a wherein the first of three display segments is shown. Yet another assumption here is that the text is made up of proportionally spaced characters and spaces.

In determining which segment to display, the lowest order segment containing the cursor is selected. Since the "O" in OF in FIG. 1 is the cursor location and can be displayed in the first segment, this segment is displayed as shown in FIG. 2a. The segment widths are different for proportional and standard spacing, and are defined in escapement units. This will be brought out in greater detail later in the specification.

Figure 2B:
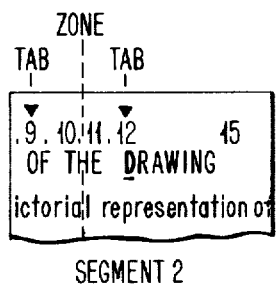
Figure 2C:
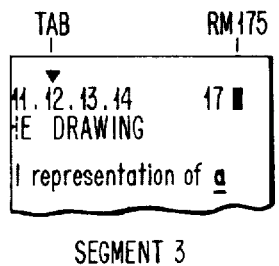
FIG. 2c is a pictorial representation of a display of yet another horizontal segment of the text shown in FIG. 1 partially overlapping the second segment shown in FIG. 2b.

Referring to FIGS. 2a, 2b, and 2c, each of the segments overlap to a certain extent. This overlap provides an operator with a reference to text in adjoining segments. Once a segment is selected though, operation remains therein until the cursor is moved either to the right or left to a position which is outside the segment. When the cursor is moved to the left and outside of the second segment, automatic segmentation will occur and the first segment will be displayed. If the cursor is moved to the right and outside of the second segment, automatic segmentation will again occur and the third segment will be displayed.

Referring next to FIG. 2b in conjunction with FIG. 1, if the cursor were the "D" in DRAWING, it can be displayed in either the second or third segment. In this case, the second segment is selected as shown in FIG. 2b. If the cursor were the last "a" in the second line of FIG. 1, it can only be displayed in the third segment as shown in FIG. 2c.

Referring again to FIGS. 2a, 2b, and 2c, a scale line including abbreviated escapement numerals and dots, tab carrots, and a right margin rectangle are displayed. The structure for, and technique of, creating this line will be brought out more fully later in the specification. For now, it is only important to note that the beginning of the display of the scale corresponds to the left margin of the sheet to be printed. For example, if FIG. 1 represents a printed sheet with a left margin (LM) twenty escapement units to the right of the left edge, the displayed scale begins with "2". This provides the operator with a visual indication of the relative position of the displayed segment to the page or sheet to be ultimately printed.

Referring specifically to FIG. 2c, a part of the character "H" is shown dotted in adjacent the left edge. This will not be displayed. Instead, there will be a space fill-in and the first character displayed on the line will be the character "E" in the position shown. This will be brought out in greater detail later in the specification.

Overall System

Figure 3:
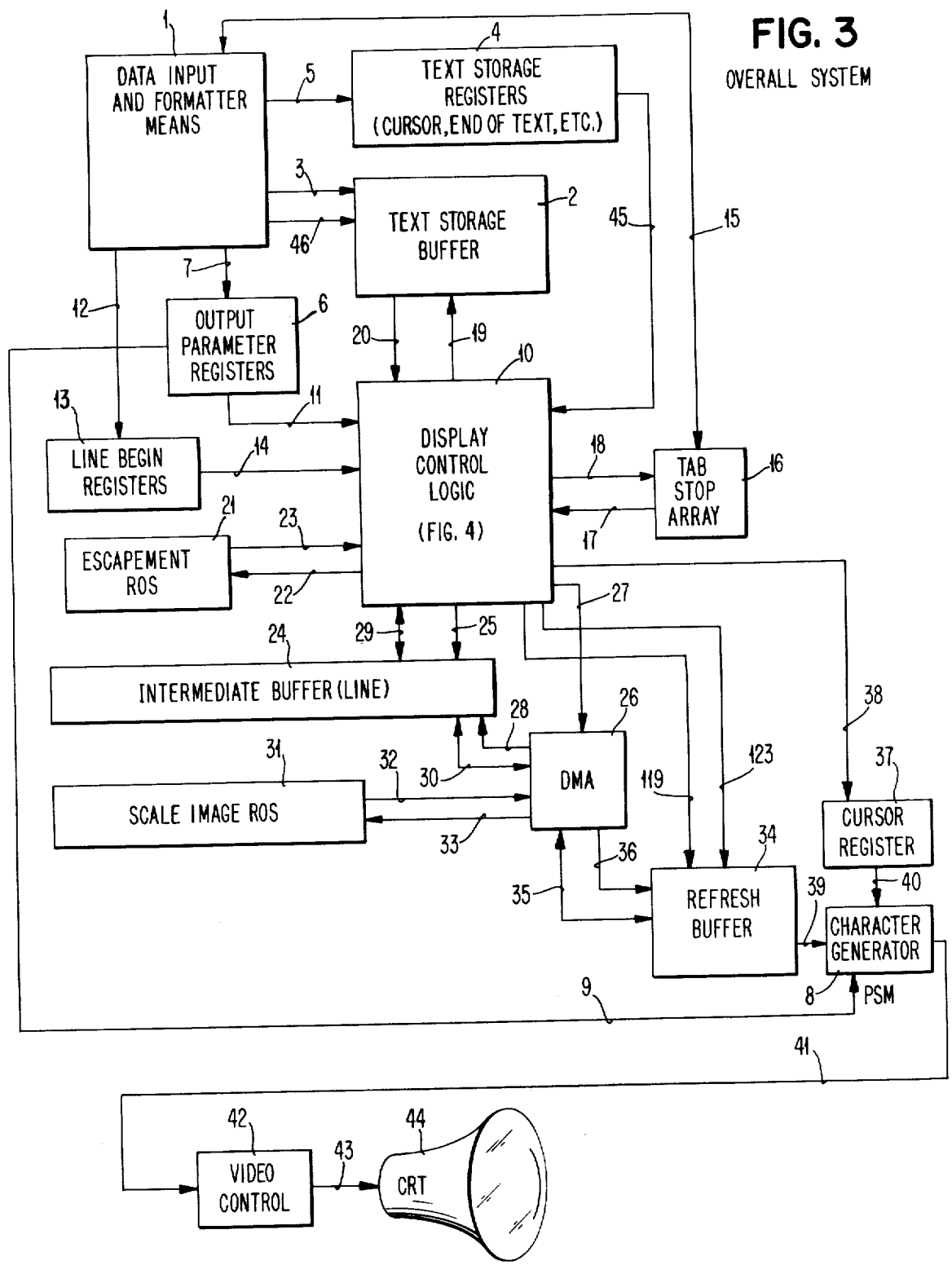
FIG. 3 is a block diagram illustrating the overall system of this invention.

Referring next to FIG. 3 there is shown a block diagram generally illustrating the overall system according to this invention. Specific details of various of the system components will be set out with reference is made to subsequent figures. Data including codes representative of the text illustrated in FIG. 1 are first derived from, or generated by, data input and formatter means 1. This means can be a keyboard, data transmission line, etc. The data generated by data input and formatter means 1 include character codes, space codes, control codes, mode and measure codes, cursor codes, tab codes, etc. Each of these codes is applied along line 3 and stored in text storage buffer 2. The storage locations in buffer 2 are determined by address pointer 46. The control codes from means 1 such as the cursor, end of text location, etc., are also applied along line 5 and stored in text storage registers block 4. Registers block 4 includes a decode, and addressing and gating means for effecting the storage therein of these control codes. Text storage buffer 2 can be an electronic dynamic shift register, random access memory, etc. Control codes denoting the left and right margin locations, and standard and proportional (PSM) spacing modes are applied along line 7 and also stored in output parameter registers block 6. Registers block 6 includes a decode, and addressing and gating means for effecting the storing therein of these control codes. The reasons for storing control codes in registers blocks 4 and 6 in addition to buffer 2 is to assure their timely availability when required by other portions of the system. The control codes stored in output parameter registers block 6 are applied along line 9 to character generator 8 and along line 11 to display control logic 10. The control codes stored in registers block 4 are applied along line 45 to logic 10. Line beginning location codes are applied along line 12 to line begin registers block 13 for storage therein. Registers block 13 includes a decode, and addressing and gating means for effecting the storage therein of the line beginning codes. The line beginning location codes are applied along line 14 to display control logic 10. If data input and formatter means 1 is a keyboard connected to a printer having an escapement and tab rack, there is an associated address pointer 15 for addressing the printer carrier location and the escapement and tab rack (tab stop array) 16 during carrier escapement. Address pointer 15 is utilized in effecting the storage of tabs.

When a number of lines are to be displayed from text codes stored in text storage buffer 2, display control logic 10 addresses text storage buffer 2 along line 19. This is to locate the beginning of the line containing the cursor. Codes making up the cursor line are then output from text storage buffer 2 along line 20 to display control logic 10. As each code is read into display control logic 10, there is an addressing of escapement ROS (read only store) 21 along line 22. This is to determine, in the case of a character for example, the escapement thereof dependent upon the spacing mode input along line 11. The escapement for the character is output from escapement ROS 21 along line 23 to display control logic 10. Each character (and space) code making up the line is then applied along line 29 and written into the line or intermediate buffer 24 in a location determined by address pointer 25. Only character (and space) codes are stored in buffer 24.

The control of DMA (direct memory access device) 26 addresses buffer 24 along line 28. The control by the DMA 26 of the write-in and later read-out of characters to and from intermediate buffer 24 is along line 30. Again, no control codes or character codes with cursor bits turned "on" are stored in buffer 24 during accumulation of character codes for text lines.

The control of DMA 26 for obtaining the appropriate segment of the scale line to be displayed is along line 27 from display control logic 10. DMA 26 addresses scale image ROS 31 along line 33. The scale image or line information made up of character and symbol codes is then applied along line 32.

This information is then applied along line 30 and stored in buffer 24 in locations addressed by pointer 28. Following the accumulation of codes for each line, including the scale line, DMA 26 causes the codes to be applied along line 35 and stored in refresh buffer 34 at locations determined by address pointer 36.

Following the output of the cursor character code from text storage buffer 2 to display control logic 10, the refresh buffer cursor location is applied along line 38 and stored in cursor register 37. This is to identify the cursor character code when input to character generator 8 from refresh buffer 34. The result is a brightened character on the face of CRT 44. Cursor register 37 is connected to character generator 8 by line 40.

The address line 119 and the data line 123 are used for connecting the line move logic portion of the display control logic 10 to refresh buffer 34. This will be more fully appreciated when reference is made to FIGS. 4 and 8.

With the first line segment containing the cursor stored in refresh buffer 34, the corresponding segments of following lines to be displayed are sequentially determined by display control logic 10. In turn, DMA 26 causes these segments to be loaded into refresh buffer 34. Following the loading of all corresponding segments (of all lines to be displayed) into refresh buffer 34, the corresponding segment of the scale line is determined and loaded into refresh buffer 34. Other operations are performed on the scale line and these will be brought out later in the specification.

The segments of the lines to be displayed have now been formatted and stored in refresh buffer 34. The character (and scale line symbol) codes making up these segments are now output along line 39 to character generator 8. The characters are generated and applied along line 41 to video control 42. Then they are applied along line 43 to display device 44. Display device 44 can be a CRT (cathode ray tube), gas panel, etc.

Display Control Logic

Figure 4:
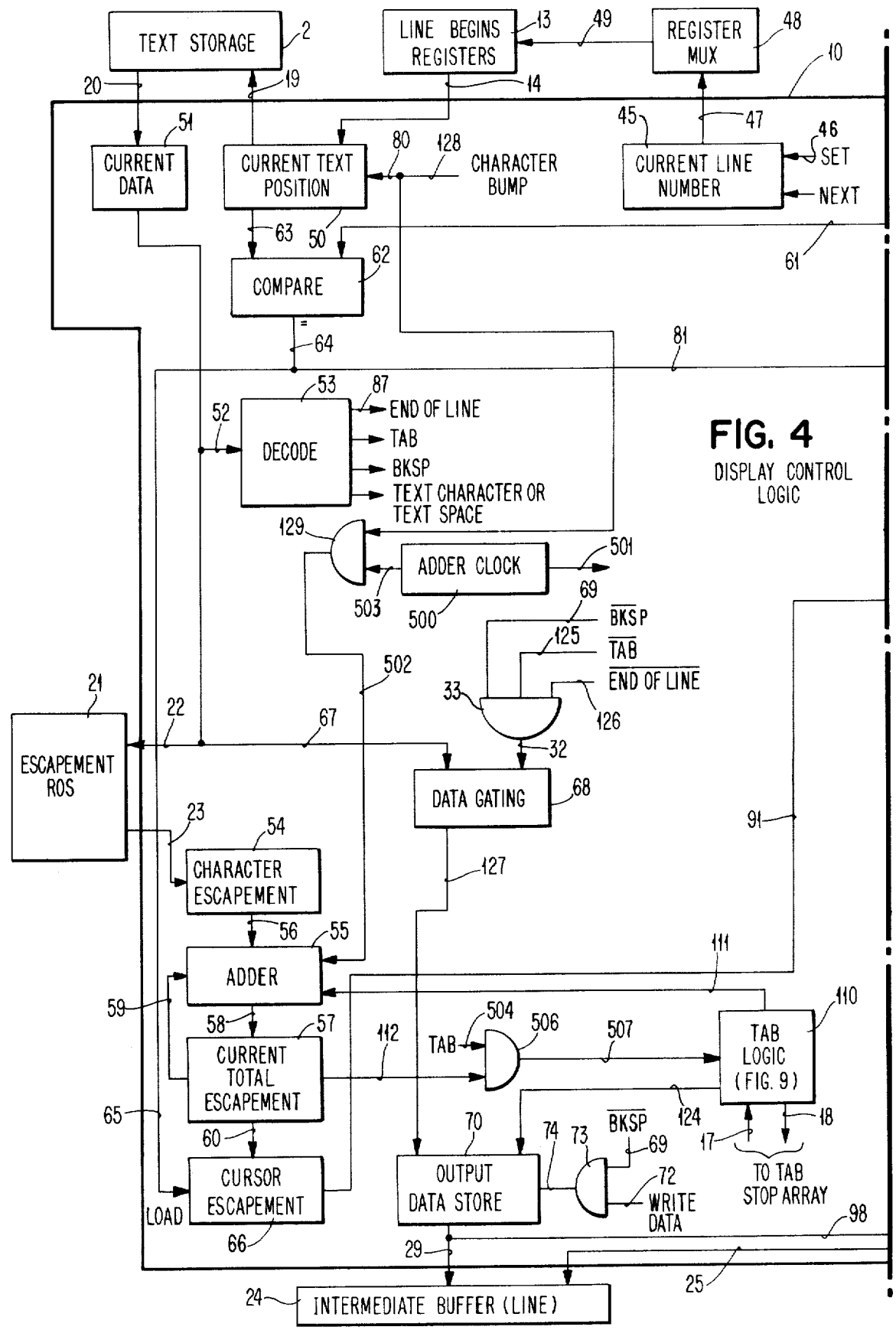
FIG. 4 illustrates the structure included in the display control logic block of FIG. 3.
Figure 4:
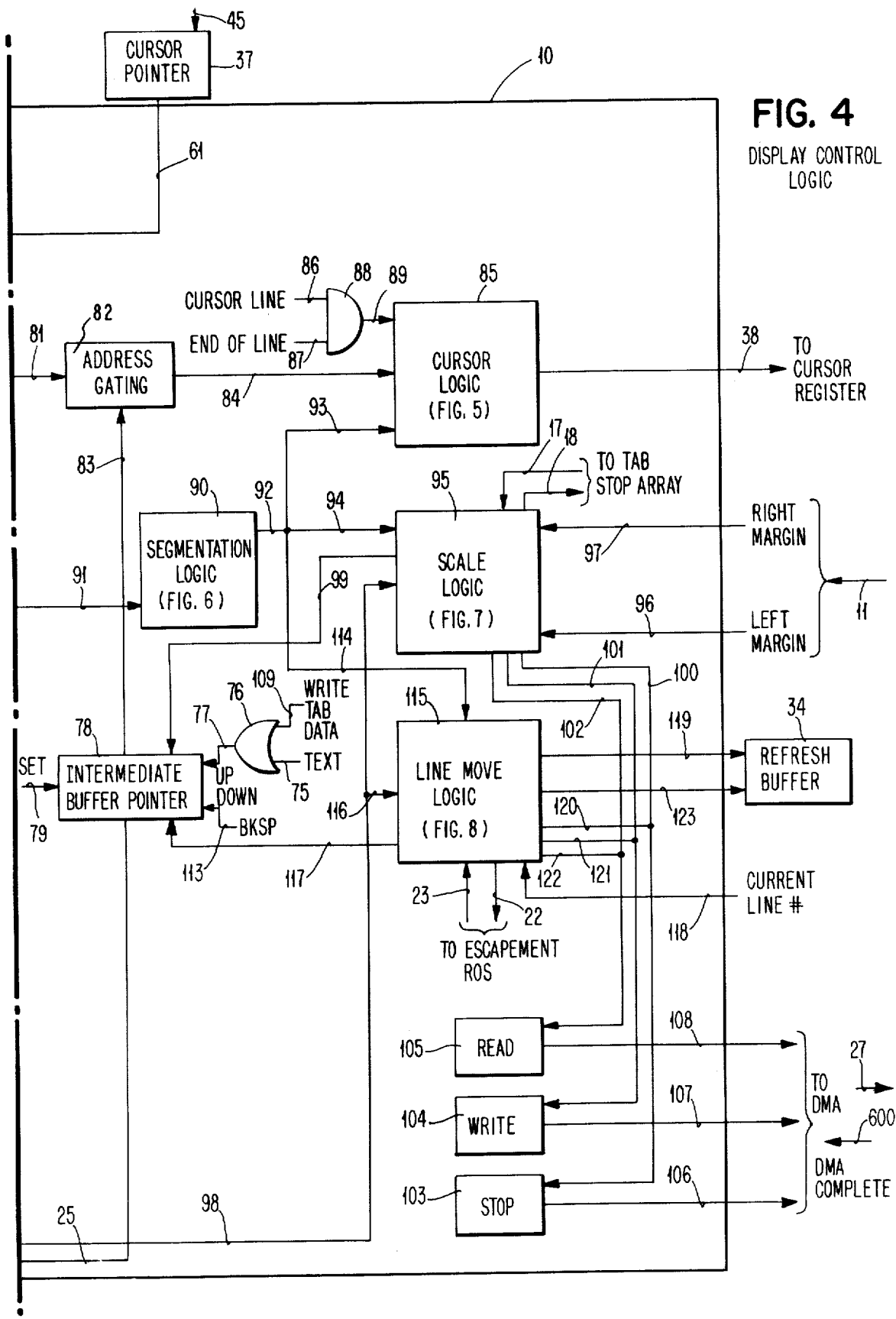

Referring next to FIG. 4, there is shown the structure included in the display control logic block 10 of FIG. 3. At the beginning of operation, a current line number register 45 is set along line 46 to the cursor line number. The output of register 45 is along line 47 to register multiplexer 48 which addresses line begin registers 13 (FIG. 3) along line 49 to locate the beginning of the cursor line. The output along line 14 is to current text position counter 50. This is used in addressing text storage buffer 2 along line 19 to locate the cursor line. The output of the text storage buffer 2 is the first data code (character, etc.) of the cursor line and this code is applied along line 20 to current data register 51. This code in turn is applied along line 52 to decode 53 for determining whether it is an end of line code, tab code, backspace code, text character or space. This code is also applied along line 22 to escapment ROS 21. The escapement for the code, if a backspace or text character or space, is then applied along line 23 to character escapement register 54. The escapement is input to adder 55 along line 56. The output of adder 55 is to current total escapement register 57 along line 58. A backspace code along line 22 will result in a subtract operation in adder 55. Register 57 stores the running count of escapement units from the left margin. This operation continues for each character, space, and backspace code until either a tab code or end of line code appears on line 20.

A point to note is that adder 55 is made up of sequential rather than combinational logic. Thus, the output along line 58 is not updated until clocked by an input along line 502 from AND gate 129. The inputs to AND gate 129 are adder clock from clock 500 along line 503 and bump along line 128. Until an updated input is applied along line 58, the adder 55 will accumulate escapement counts as each character is applied along line 20.

The code output from current data register 51 is also applied along line 67 to AND gate 68. The other input to gate 68 is along line 32 from AND gate 33. The inputs to AND gate 33 are NOT backspace along line 69, NOT tab along line 125, and NOT end of line along line 126. When an up signal is applied along line 32, the code appearing on line 67 is gated along line 127 to output data store register 70. From output data store 70, the code is applied along line 29 and written into intermediate buffer 24. This writing into buffer 24 occurs upon the application of both a NOT back-space signal along line 69 and a write data signal along line 72 to AND gate 73. The output of AND gate 73 is along line 74 to output data store 70 for causing the gating of the code stored in store 70 along line 29.

The location of the cursor is stored in cursor register 37 (FIG. 3). The location count is output along line 61 to compare unit 62. In compare unit 62 a comparison is made with the current code position being addressed in buffer 2. The current code position count is stored in counter 50 which is incremented by a bump signal applied along line 80 as each code is addressed along line 19. The count stored in counter 50 is applied along line 63 to compare 62. When a compare occurs indicating that the counts applied along lines 61 and 63 are equal, there will be an output signal applied along line 64. This signal is then applied along the load line 65 to effect the loading of the cursor escapement register 66 with the escapement count stored in register 57. This count will include the count for the cursor character. Register 57 is connected to register 66 by line 60. The count in register 66 is then applied along line 91 to segmentation logic block 90. Logic 90 is used for determining the segment, including the cursor, which is to be displayed. This will be described in greater detal when reference is made to FIG. 6.

The output of compare 62 is also applied along line 81 to AND gate 82. The other input to AND gate 82 is along line 83 from intermediate buffer pointer counter 78. Counter 78 is a resettable up/down counter. Counter 78 is set along line 79 to the beginning location of intermediate buffer 24 when the beginning of the line is read out of buffer 2. Counter 78 is incremented for each character code upon a signal being applied along either the write tab data line 109 or text line 75. Thus, the count stored in counter 78 at any one time is the address count of the character being written into buffer 24. Lines 75 and 109 are connected to OR gate 76 which is in turn connected to counter 78 along the up line 77. A signal appearing on the up line 77 for a character code appearing on line 20 will result in counter 78 being incremented by one. A backspace code appearing on line 20 will result in counter 78 being decremented by one due to a up signal being applied along backspace line 113.

Upon a compare signal appearing on line 81, the count in counter 78 will be gated through AND gate 82 and applied along line 84 to cursor logic block 85. The function and structure of block 85 will be more fully appreciated when reference is made to FIG. 5. For now, the other inputs to block 85 are applied along lines 89 and 93. An up signal appears on line 89 when there is both an indication along line 87 that the end of the current line has been stored in buffer 24, and along line 86 that operation involves the cursor line. These signals are applied to AND gate 88. The input along line 93 to block 85 is from the output of block 90 along line 92. The output from block 85 is along line 38.

When a tab code appears on line 20, it is stored in current data register 51. Thereafter, it is applied along line 52 to decode 53 for decoding. The tab code is also applied along line 22 to escapement ROS 21. There is no escapement for a tab stored in escapement ROS 21. Therefore, a zero output is applied along line 23 to character escapement register 54. A zero is in turn applied along line 56 to adder 55. The count remains the same in adder 55 and is applied along line 58 to current total escapement 57 as described above. The output of current total escapement 57 is applied along line 112 to AND gate 506. The other input to AND gate 506 is tab along line 504 from decode 53. The output of AND gate 506 is along line 507 to tab logic block 110. Tab logic 110 will be described in greater detail when reference is made to FIG. 9. For now, tab logic 110 addresses the tab stop array shown in FIG. 3 along line 18 and receives data back along line 17. This is to determine the count of units of escapement to the next set tab. When this count of units has been determined, an output from tab logic 110 is applied along line 111 to adder 55. It is again to be noted that tabs are not stored in buffer 24. The escapement unit count is applied along line 111 to adder 55. Adder 55 is incremented for the number of one escapement unit spaces to be input into buffer 24 for the tab code read. The contents of adder 55 are then applied along line 58 to current total escapement register 57. At this time, tab logic 110 causes signals to be applied along the write tab data line 109 to OR gate 76, and then along line 77 for incrementing intermediate buffer pointer 78 the desired number of characters. Each time intermediate buffer pointer 78 is incremented, the logic 110 outputs a space code along line 124 to output data store 70. The intermediate buffer pointer 78 along line 25 is repositioned to a point corresponding to the next set tab for the write in of additional characters making up the line.

The output of segmentation logic block 90 along line 92 is applied along line 94 to scale logic block 95. Other inputs to scale logic block 95 are the locations of the left and right margins along lines 96 and 97, respectively. These are derived from line 11 in FIG. 3. Another input to scale logic block 95 is from output data store 70 along line 98. Further, scale logic block 95 is in two-way communication along lines 17 and 18 with the tab stop array 16 shown in FIG. 3. One output from scale logic 95 is along line 99 to intermediate buffer pointer 78. The remaining outputs of scale logic 95 are along lines 100, 101, and 102 to the stop, write, and read registers 103, 104 and 105, respectively. The outputs of the stop, write, and read registers 103-105 are along lines 106, 107, and 108, respectively, to DMA 26. Block 95 will be discussed in greater detail when reference is made to FIG. 7.

The occurrence of a backspace code results in an up signal being applied along line 113 to intermediate buffer pointer counter 78. This is for decrementing the pointer 25. The next incoming character code along line 29 to buffer 24 will then be written over the character code before the backspace code. Also, the current total escapement count in register 57 is adjusted dependent upon the read out of the escapement ROS 21 for the backspace code.

The output of segmentation logic block 90 along line 92 is also applied along line 114 to line move logic block 115. Another input to line movement logic 115 is along line 116 from output data store 70. One output of line move logic 115 is along line 117 to intermediate buffer pointer counter 78. Line move logic 115 is also in communication with escapement ROS 21 along lines 22 and 23. Another input to line move logic 115 is the current line number along line 118. Other outputs from line move logic are along address line 119 and data line 123 to refresh buffer 34, and along lines 120, 121, 122, to stop, write and read registers 103, 104 and 105, respectively. One point to note here is that the DMA 26 is not used in the transfer of data along line 123 to refresh buffer 34. Block 115 will be described in greater detail when reference is made to FIG. 8.

Cursor Logic

Figure 5:
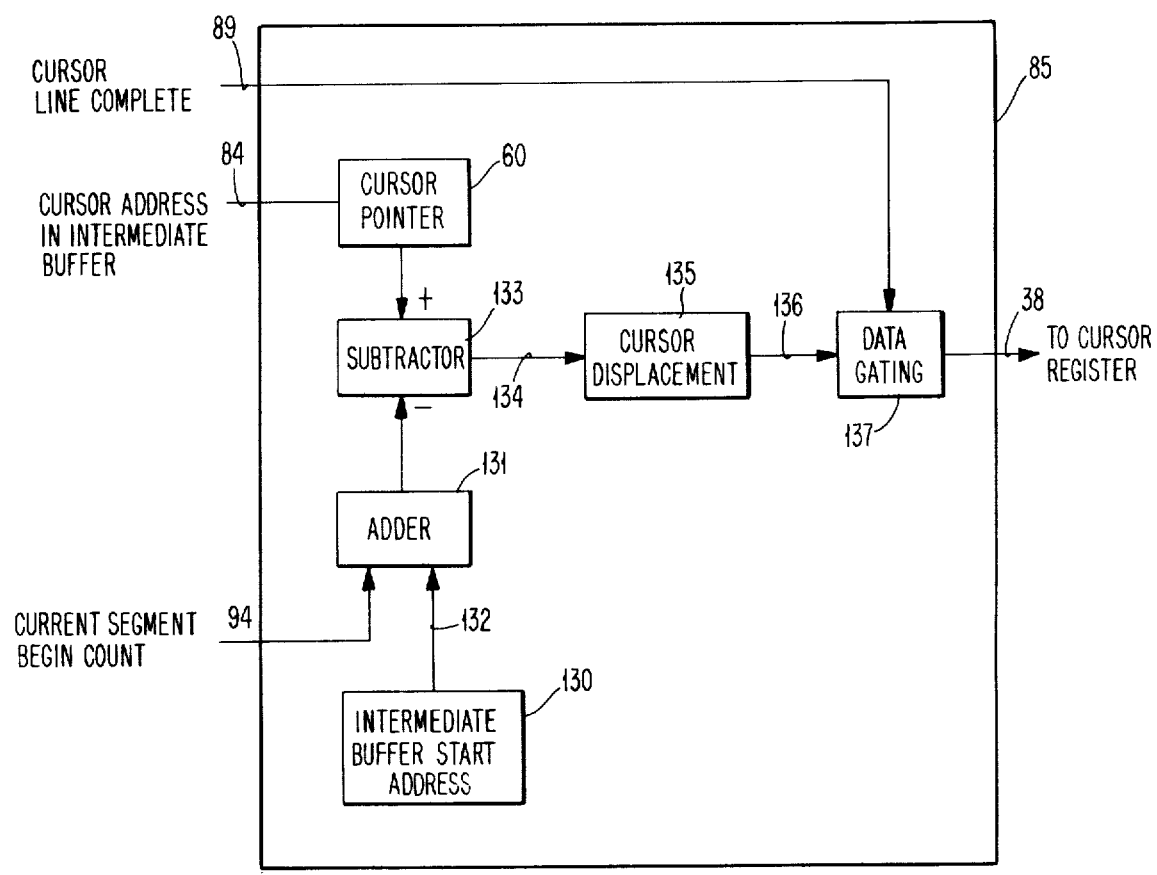
FIG. 5 illustrates the structure included in the cursor logic block of FIG. 4.

Reference is next made to FIG. 5 wherein there is shown the structure included in the cursor logic block 85 of FIG. 4. The inputs to the cursor logic are cursor line complete along line 89, the cursor address in intermediate buffer along line 84, and current segment begin point from the left margin along line 94. The current address of the cursor in the intermediate buffer along line 84 is input to the cursor pointer register 60. The current segment begin point from the left margin along line 94 is input to an adder 131. Referring back to FIG. 4, this is obtained from segmentation logic block 90. The count stored in intermediate buffer start address register 130 is a constant corresponding to the count for the first character storage location in buffer 24. This count can be representative of the location of the left margin setting. This count is applied to adder 131 along line 132 for summing with the current segment begin count from the left margin applied along line 94. The sum of the counts applied along lines 94 and 132 is subtracted by subtractor 133 from the count stored in the cursor pointer register 60. The count thus obtained is applied along line 134 to cursor displacement register 135. The count contained in cursor displacement register 135 is the count from the beginning of the segment being worked on. This count is then applied along line 136 to AND gate 137. The other input to AND gate 137 is along line 89 indicating that the cursor line has been completed. The count in register 135 is then applied along line 38 and stored in the cursor register 37 (FIG. 3).

Segmentation Logic

Figure 6:
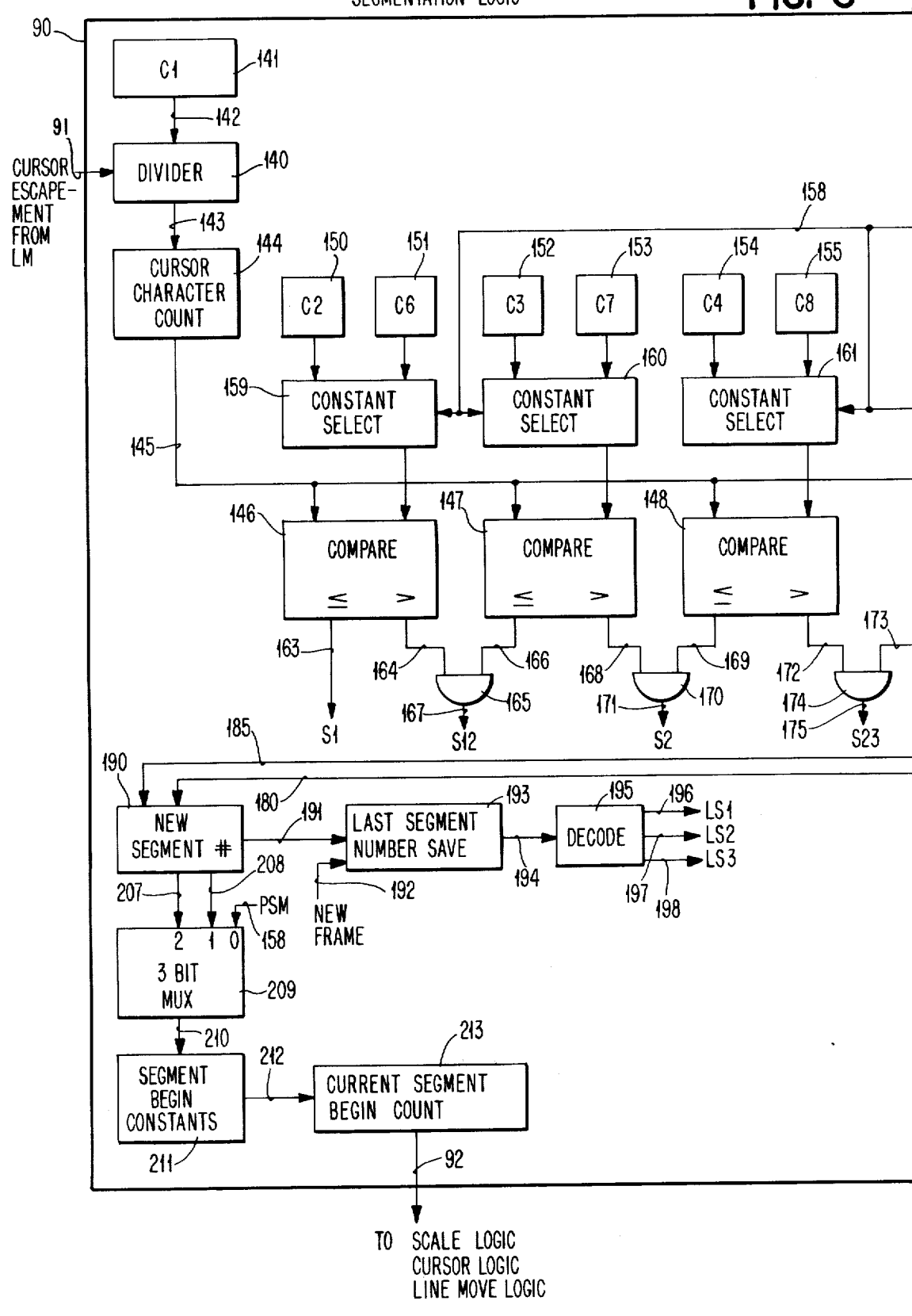
FIG. 6 illustrates the structure included in the segmentation logic block of FIG. 4.
Figure 6:
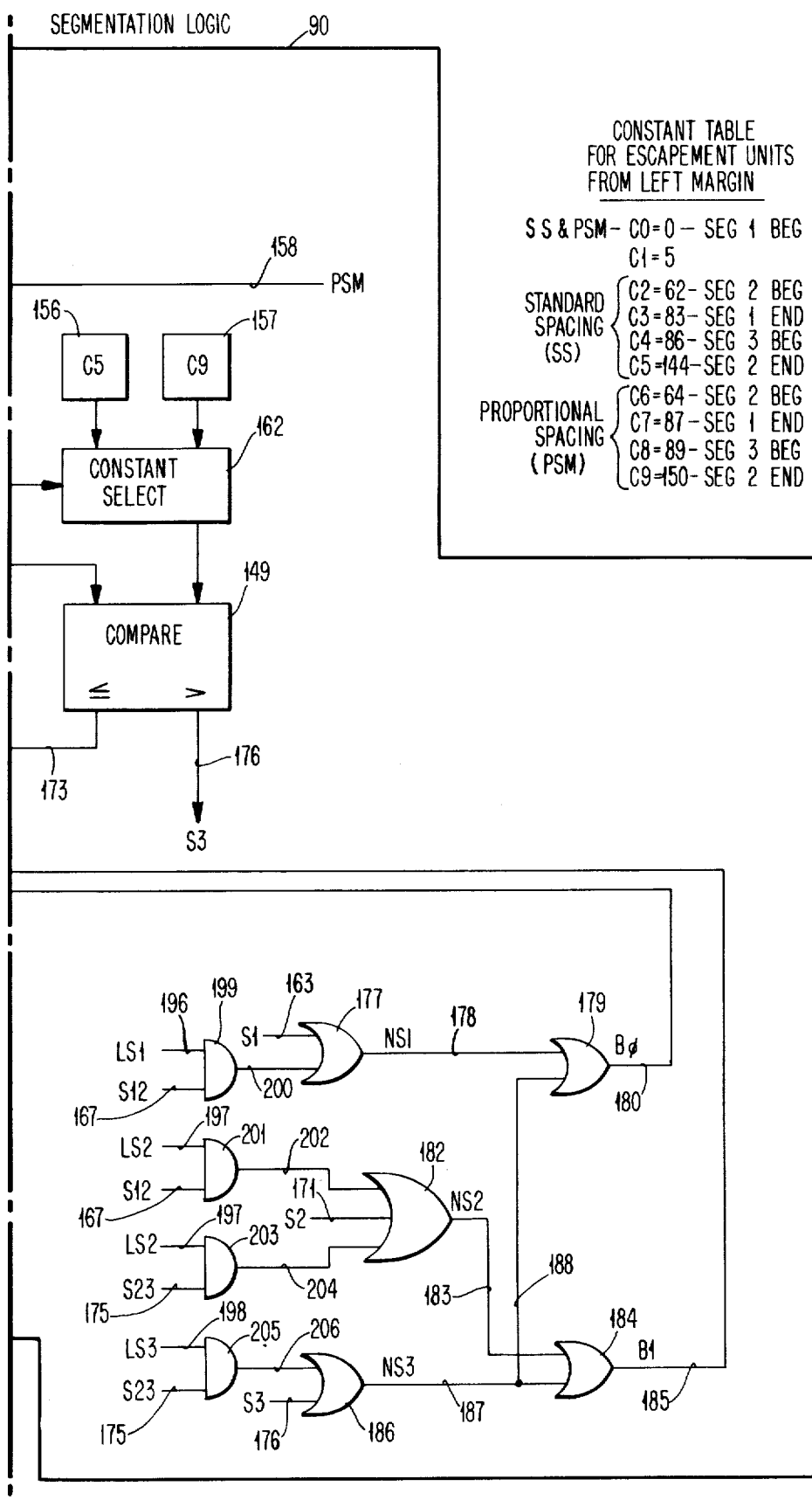

Reference is next made to FIG. 6 wherein there is shown the structure included in the segmentation logic block 90 of FIG. 4. It is noted that segmentation logic 90 has one input along line 91. This input is a count of the number of escapement units from the left margin to the cursor position. The count is input to divider 140, and divided by a constant stored and contained in constant register 141. The constant is applied to divider 140 along line 142. Referring to the constant table in the upper right hand corner, the value of the constant C1 is 5 escapement units. This constant is the escapement count for spaces, symbols, and all numerals. In addition, it is the count for scale symbols when operation is in proportional spacing. Further, this count is the average number of escapement units for each character in proportional spacing. Divider 140 is structured to output only whole numbers. Any remainder is in effect discarded. The whole number output from divider 140 is applied along line 143 to cursor character count register 144. In terms of proportional spacing, this whole number will be an equivalent number of 5 EU characters from the left margin. For standard spacing this whole number will be the exact number of characters from the left margin. The output of the cursor character count register 144 is applied along line 145 to compare units 146, 147, 148 and 149. Other inputs to compare units 146–149 are from constant registers C2–C9 designated by reference numerals 150–157 when gated by constant select gates 159–162. Registers 150–157 contain the escapement unit count shown in the table in the upper right hand corner. These counts are applied to constant select gates 159–162. These gates are structured to gate the count contained in constant registers 150, 152, 154, and 156 to compare units 146–149 when operation is in standard spacing. When operation is in proportional spacing (PSM), a signal will be applied along line 158 to these gates for causing the gating of the count contained in registers 151, 153, 155, and 157 to compare units 146–149.

Considering constant select gate 159, for example, this can be made up of AND gates for each register bit having one input from each bit of register 150 and an inverted input from line 158. The outputs of these register AND gates are to additional OR gates and then to compare unit 146. Other inputs to these additional OR gates would be from other AND gates having inputs from line 158 and register 151.

The comparison in compare units 146–149 is with the cursor character count from register 144 along line 145, and the selected set of registers 150–157. Referring again to compare unit 146, if the character count applied along line 145 is less than, or equal to, the constant count from the selected one of registers 150 and 151, then an output is applied along the S1 line 163. If the character count along line 145 is greater than the input constant count, then the output from compare 146 is applied along line 164 to AND gate 165.

If an output is applied from compare 146 along the S1 line 163, this is applied to OR gate 177. The output of OR gate 177 is a new first segment (NS1) signal along line 178 to OR gate 179. It is to be noted here that upon power "on", operation begins in the first segment. If a signal is applied along line 178, operation remains in segment 1. The output of OR gate 179 is along the bit zero (B0) line 180 to new segment number register 190. Register 190 is a two bit register for storing the segment number in binary form.

Referring back to AND gate 165, an output will be applied along the S12 line 167 when the cursor character count along line 145 is less than, or equal to, the input constant from the selected one of constant registers C3 and C7. An output along the S12 line 167 is applied to AND gates 199 and 201. Whether an output appears on either of lines 200 or 202 depends upon the up or down inputs to AND gates 199 and 201 along the LS1 line 196 and the LS2 line 197. The derivation of the LS1 and LS2 inputs is from decode 195. Assuming operation were initially in the first segment, the first segment number would be stored in register 193 and an output would appear along the LS1 line 196. The gating of the last segment number from register 193 to decode 195 is along line 194. With the LS1 signal "up" along line 196, and the S12 signal "up" along line 167, an "up" signal is gated through AND gate 199, along line 200, through OR gate 177, and along the NS1 line 178. This would result in a one being applied along the B0 line 180 to new segment number register 190. In this case, operation remains in the first segment. Since the previously selected segment was the first, the output from register 190 is along line 191 to register 193, and the output of decode 195 is along the LS1 line 196. The output of register 193 is along line 194 to decode 195 each time a new frame is to be generated for display. When a new frame is to be generated, a new frame signal is applied along line 192. The above discussion has been directed toward outputs along either the S1 or S12 lines, and operation remaining in the first segment.

Considering standard spacing, if the cursor is located between the left margin which has a constant value of zero and C2 which has a constant value of 62, the cursor will be located solely in the first segment. If the cursor is located between C2 and C3, then it can be in either the first or second segment. As pointed out above though, segmentation will not occur unless the cursor is moved and caused to overrun one of the segments. Therefore, for a cursor location between 0 and 83 escapement units from the left margin, the operating segment will be the first segment. If the cursor is moved to 84, then it will be located exclusively in the second segment. If the cursor is moved to 87, then it can be located in either the second or third segments. In this case, operation will be in the lowest order segment which is the second segment. Although not specifically pointed out, it was assumed in the above that forward escapement was taking place. The rules are the same for reverse escapement when the cursor is backspaced.

The output of segment begin constants ROS 211 is along line 212 to current segment begin count register 213. For the first segment it will be zero, for the second segment it will be 62, and for the third segment it will be 86. This is assuming operation in standard spacing. Corresponding values are shown in the constant table for proportional spacing. The contents of the current segment begin count register 213 are applied along line 92 to the cursor logic block 85, scale logic block 95, and line move logic block 115 shown in FIG. 4.

Refer again to the constant select gates, and particularly the constant select gate 160. If the cursor character count along line 145 is greater than the constant selected by constant select gate 160 from constant registers C3 and C7, an output is applied along line 168 to AND gate 170. An "up" output along the S2 line 171 will not occur until there is an output along line 169 from compare 148. The output along line 169 from compare 148 denotes that the cursor character count from register 144 is less than, or equal to, the selected constant stored or contained in registers 154 and 155. When an output appears on the S2 line 171, it is applied to OR gate 182. This denotes that operation is to be solely in the second segment. The output of OR gate 182 is a new second segment (NS2) signal applied along line 183 to OR gate 184. The output of OR gate 184 is along the bit one (B1) line 185 to new segment number register 190. If the previous operation were in the first segment, the output of decoder 195 would be along the LS1 line 196. This is due to the up output along the B0 line 180 as will be described later herein.

When operation begins in the second segment, the output of new segment number register 190 is along line 191 to last segment number save register 193. This occurs when a new frame signal is applied along line 192. The new frame signal along line 192 appears due to the fact that a new frame must be generated for the second segment. The second segment number from register 193 is applied along line 194 to decode 195. For the second segment, the output of decode 195 is along the LS2 line 197 to AND gates 201 and 203. There are no outputs from AND gates 201 and 203 since the inputs S12 and S23 are down.

If the output of compare 148 indicates that the cursor character count 144 along line 145 is greater than one of constants C4 and C8 selected by constant select gate 161, an output is applied along line 172 to AND gate 174. For an "up" S23 output from AND gate 174 along line 175, there must be an "up" output along line 173 from compare 149. This will occur when the cursor character count along line 145 is less than, or equal to, the selected constant from registers 156 and 157. The outputs of registers 156 and 157 are applied to constant select gate 162. When an output appears along the S23 line 175, it is applied to both AND gates 203 and 205. Since the last segment was the second segment, and an output appeared from decode 195 along the LS2 line 197, AND gate 203 is the pertinent gate. The output of AND gate 203 is along line 204 to OR gate 182. The output of OR gate 182 is along the NS2 or new second segment line 183 to OR gate 184. The output from OR gate 184 is along the bit one (B1) line 185 for operation to continue in the second segment.

As the cursor is moved further to the right, there will ultimately be an output along the S3 line 176. This is applied to OR gate 186. The output of OR gate 186 is along the new third segment (NS3) lines 187 and 188 to OR gates 184 and 179. The outputs of OR gates 184 and 179 are along lines 185 and 180 to register 190. Again, register 190 is a two bit register, and it has 4 states (00, 01, 10, and 11). The 00 state is invalid (or not used). The up outputs along lines 180 and 185 cause the storing of a state in register 190 which is representative of the third segment. When operation begins in the third segment, there is an output long the LS3 line 198 from decode 195, and this is applied to AND gate 205.

If the cursor is backspaced to a point where it can exist in either the second or third segments, a signal is applied along the S23 line 175 to AND gates 203 and 205. The other input to AND gate 203 is down. The output of AND gate 205 is "up" and is along line 206 to OR gate 186. The output of OR gate 186 is along the NS3 lines 187 and 188 to OR gates 184 and 179. The one outputs from OR gates 179 and 184 are applied along lines 180 and 185 to in essence load a three into register 190. That is, register 190 is set to one of the states described above. Operation remains in the third segment. From the above, it is to be appreciated that upon either forward or reverse escapement of the cursor, segmentation will not occur until the cursor overruns a segment in either direction.

Scale Logic

Figure 7:
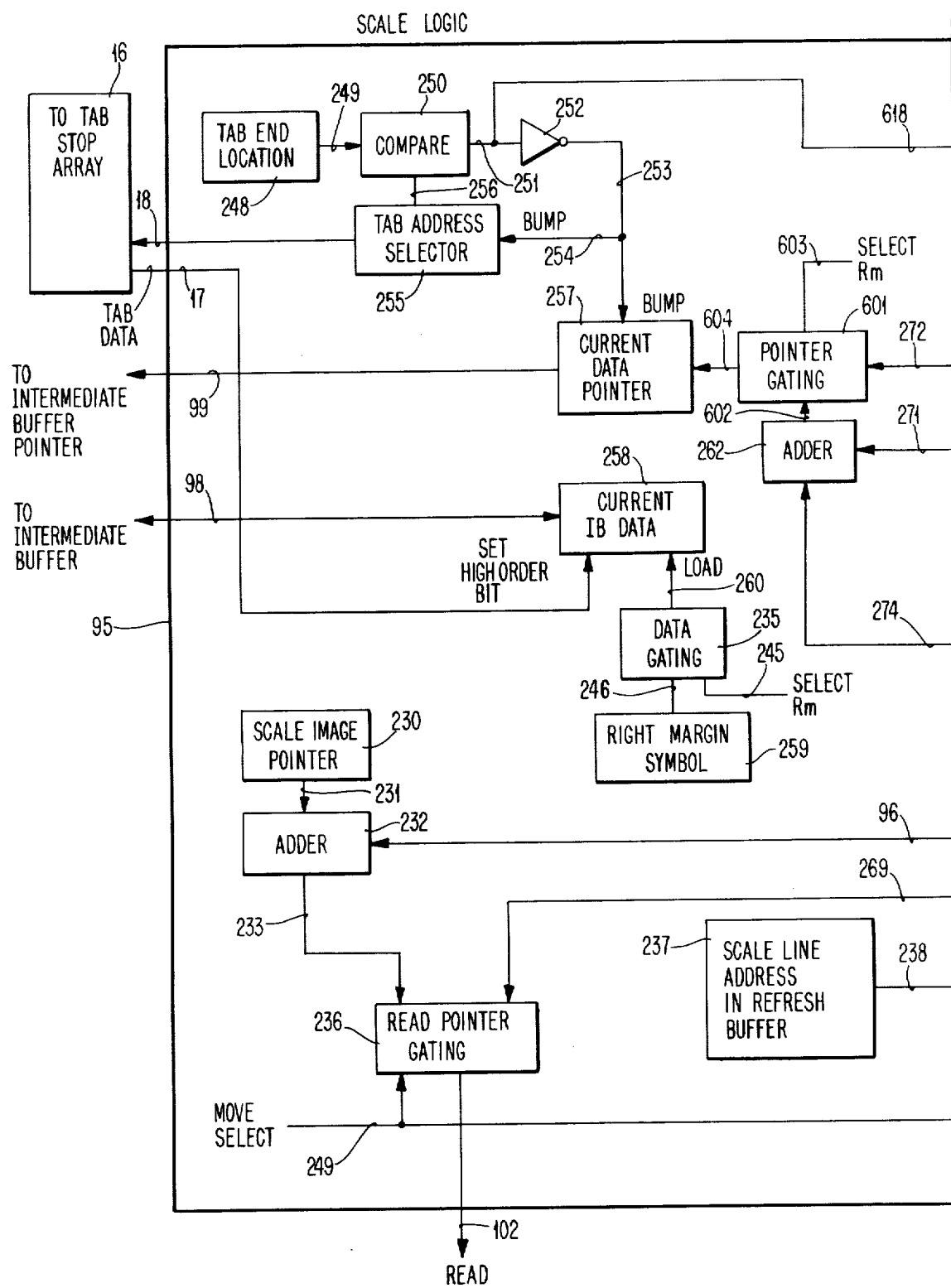
FIG. 7 illustrates the structure included in the scale logic block of FIG. 4.
Figure 7:
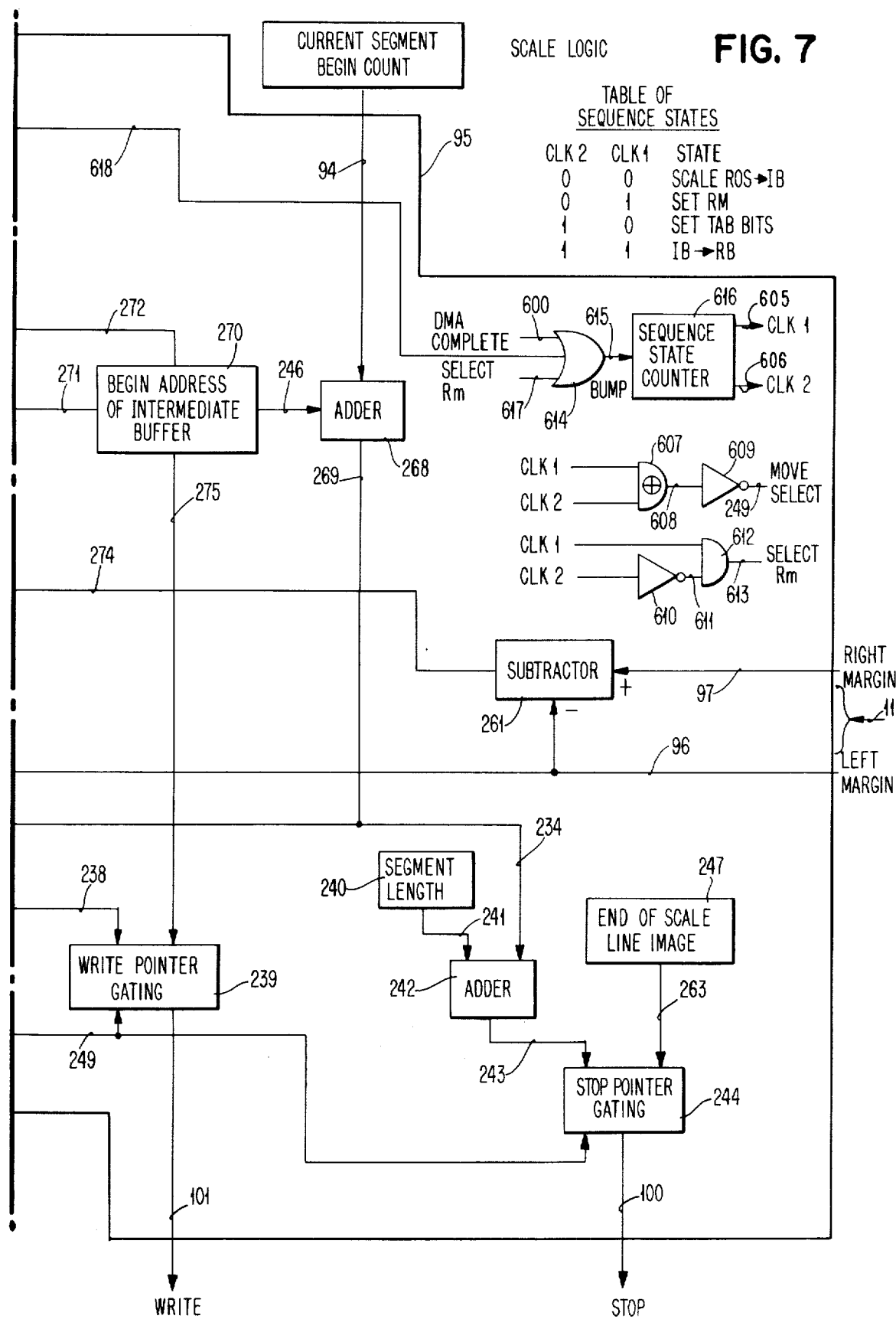

Reference is next made to FIG. 7 wherein there is shown the structure included in the scale logic block 95 of FIG. 4. This structure is used first for reading the scale image, beginning with the left margin, out of the scale image ROS 31 in FIG. 3 and writing it into the intermediate buffer 24. Thereafter, this structure causes the appropriate segment of the scale image to be read out of the intermediate buffer and written into the refresh buffer 34.

To begin with, the left margin location, in terms of character count, is read in along line 96 and applied to adder 232. To this count is added a count stored in scale image pointer register 230. The count stored in register 230 is the location being addressed in the scale image ROS 31. This location count can be assumed to be a zero. The output of the scale image pointer register 230 is applied along line 231 to adder 232. The sum output from adder 232 is applied along line 233 to AND gate 236. This determines the point in the scale image ROS 31 where reading by DMA 26 is to begin. The other input to AND gate 236 is along the move select line 249. When the input along line 249 is up, the sum from adder 232 is applied along line 102 to DMA 26. Before a signal is applied along line 249, the stop point in the ROS 31 and the write point in intermediate buffer 24 must be determined. After all points are determined, the reading of the scale image will begin at a point corresponding to the left margin and the remainder of the scale image will be written in the intermediate buffer 24.

Next, it must be determined where in the intermediate buffer 24 the beginning of the scale line is to be written. Block 270 is a register containing a constant which is the begin address in the intermediate buffer. This can be assumed to be zero. This address is applied along line 275 to AND gate 239. When a move select signal is applied along line 249, the begin address in the intermediate buffer 24 will be output along line 101 to DMA 26. This will control the writing of the appropriate beginning of the scale image into the intermediate buffer.

The point at which the reading of ROS 31 is to stop is determined by the count stored in constant register 247. This count is input to AND gate 244 along line 263. There are now inputs to AND gate 236, 239, and 244. An input is now applied along the move select line 249, and outputs are applied along lines 102, 101, and 100 to DMA 26. The scale image is now read out of ROS 31 and written into buffer 24.

The scale logic is controlled by a four state sequence state counter 616 having an input applied along line 615 from OR gate 614. This input controls the counter by causing it to be bumped to the next state. DMA complete line 600 is applied to OR gate 614 and controls bumping between states 0,0 and 0,1 and states 1,1 and 0,0. Refer to the sequence states table in the upper right hand corner. DMA complete line 600 is generated by the DMA 26 to signal that it has completed a read and write operation. The outputs of the sequence state counter 616 along the CLK1 line 605 and CLK2 line 606 are applied to exclusive OR gate 607. The output of exclusive OR gate 607 is along line 608 to inverter 609. The output of inverter 609 is along the move select line 249. CLK2 line 606 is also applied to inverter 610. The output of inverter 610 is along line 611 to AND gate 612. The other input to AND gate 612 is along the CLK1 line 605. The output of AND gate 612 is along line 613. The other inputs to OR gate 614 are select RM (right margin) line 617, and an output along line 618 from compare 250. Line 618 indicates completing of the tab setting operation, and controls bumping between states 1,0 and 1,1. Select RM line 617 controls bumping from state 0,1 to state 1,0.

After the scale image is written into intermediate buffer 24, a right margin code is written into buffer 24. After the scale is in intermediate buffer 24, an up signal is applied along line 245 to AND gate 235. A right margin code generated by code generator 259 is applied along line 246 to AND gate 235. This code is then gated along line 260 and loaded into register 258 for writing into buffer 24. The writing location in buffer 24 must be determined for the right margin. The right margin location is input along line 97 to subtractor 261. From this is subtracted the left margin location which is input along line 96. The output of subtractor 261 is along line 274 to adder 262. This output is the measure count. The other input to adder 262 is a constant along line 271 from the begin address of intermediate buffer register 270. This constant can be assumed to be zero. The sum output from adder 262 is applied along line 602 to pointer gating unit 601. This unit controls the address being output along line 604 to current data pointer counter 257. Counter 257 is set to the address of the location where the right margin symbol is desired in intermediate buffer 24. Current data pointer counter 257 controls the addressing of buffer 24 along line 99.

After the right margin symbol has been output to intermediate buffer 24, a scan operation starts for setting tabs over the appropriate scale symbols read out of ROS 31. Counter 257 is set along line 604 to the address of the beginning of buffer 24 at the start of the scan operation. The output of pointer gating 601 along line 604 is determined by the output of the begin address of intermediate buffer register 270 along line 272. This input is used by pointer gating unit 601 since the input along the select RM line 603 is down.

As each character code in buffer 24 is read, pointer 257 is incremented to the next character code location. This incrementing is caused by signals applied along the bump line 253. In conjunction with the incrementing of pointer 257, the tab address selector 255 is incremented for addressing tab stop array 16 along line 18. When a set tab is addressed, an output is applied along line 17. This output is utilized for turning on the tab bit of the character or symbol code addressed and read into current intermediate buffer data register 258. The scale symbol or character, including the previously mentioned tab bit, is then applied along line 98 and written back into buffer 24. This operation continues until the end of the tab stop array 16 is reached. The count representative of this location is a constant and is stored in tab end location register 248. This count is applied along line 249 to compare 250. The other input to compare 250 is along line 256 from tab address selector 255. The output of compare 250 is along line 251, to inverter 252, and then along lines 253 and 254. Until the end of the array 16 is reached, up outputs are applied along bump lines 253 and 254. When the end of array 16 is reached, selector 255 and pointer 257 are no longer incremented. The scale line stored in buffer 24 has now been formatted in terms of including set tabs and the right margin.

At this time, the sequence state counter has been bumped to 1,1. In order to determine the segment of the formatted scale line which is to be input into the refresh buffer, the current segment begin count is applied along line 94 to adder 268. This count is added to the count for the beginning address in the intermediate buffer stored in constant register 270. The output of register 270 is applied to adder 268 along line 246. The sum output from adder 268 is applied along line 269 to AND gate 236. This will determine the begin point for a reading of the scale line in intermediate buffer 24 for transfer of a segment of the scale line to the refresh buffer 34. The stop point for reading in the intermediate buffer 24 is determined by the output of adder 242. To adder 242 is applied the sum output from adder 268 along line 234. The other input to adder 242 is a segment length constant stored in constant register 240. This is applied along line 241. The constant stored in register 240 will be sufficiently large to cover any segment length. The sum output from adder 242 is applied along line 243 to AND gate 244. This will determine the reading stop point in intermediate buffer 24 which is to be read by DMA 26.

The write point for writing the scale line segment into the refresh buffer 34 is determined by the constant stored in scale line address in refresh buffer register 237. As a practical matter, this can be considered to be zero. With AND gates 236, 239, and 244 having inputs designating the read and stop points in buffer 24 as well as the write point in refresh buffer 34, a move select signal is applied along line 249. This will result in outputs being applied along the read line 102, write line 101, and stop line 100 to DMA 26. The appropriate segment of the scale line will now be written into refresh buffer 34.

Line Move Logic

Figure 8:
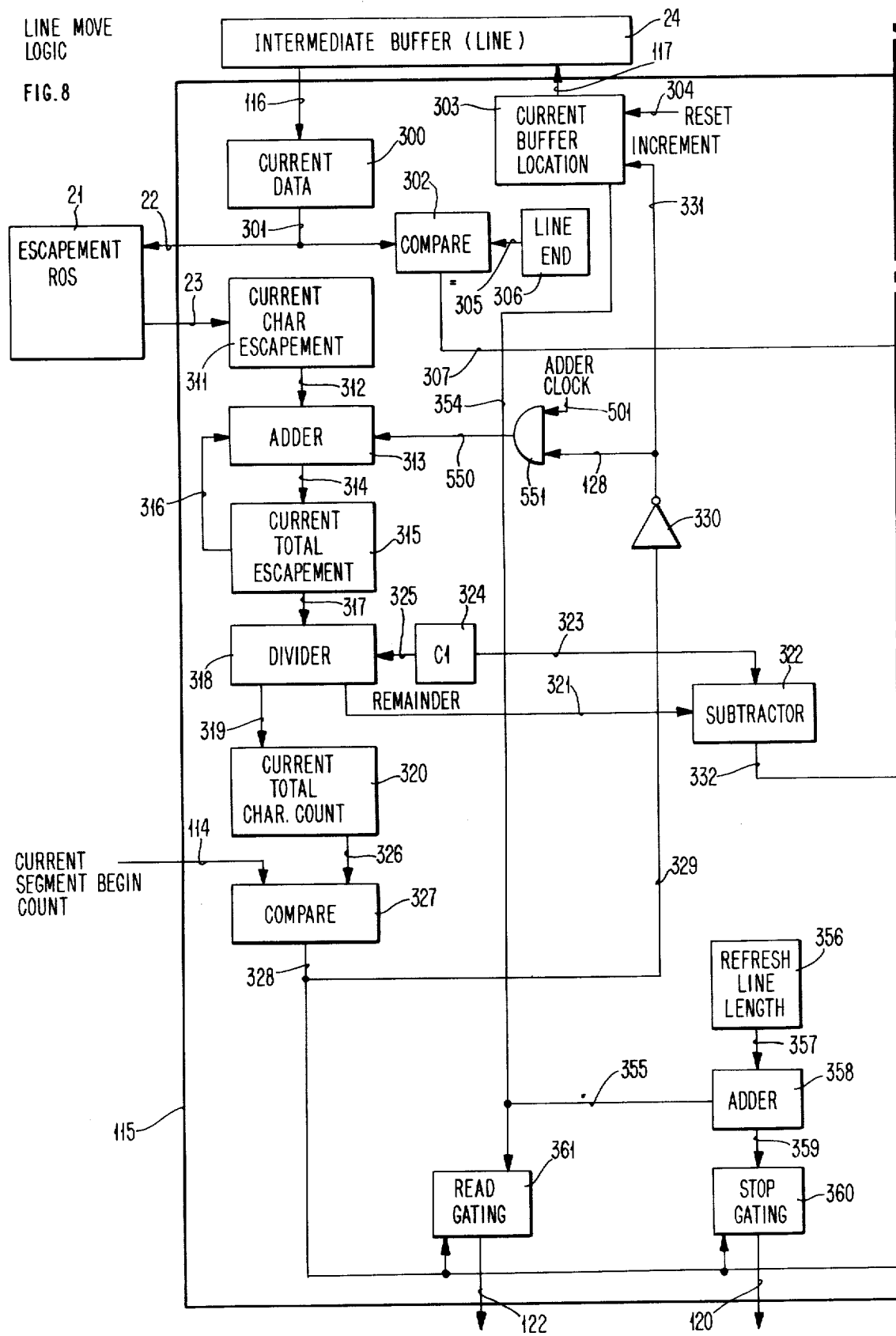
FIG. 8 illustrates the structure included in the line move logic block of FIG. 4.
Figure 8:
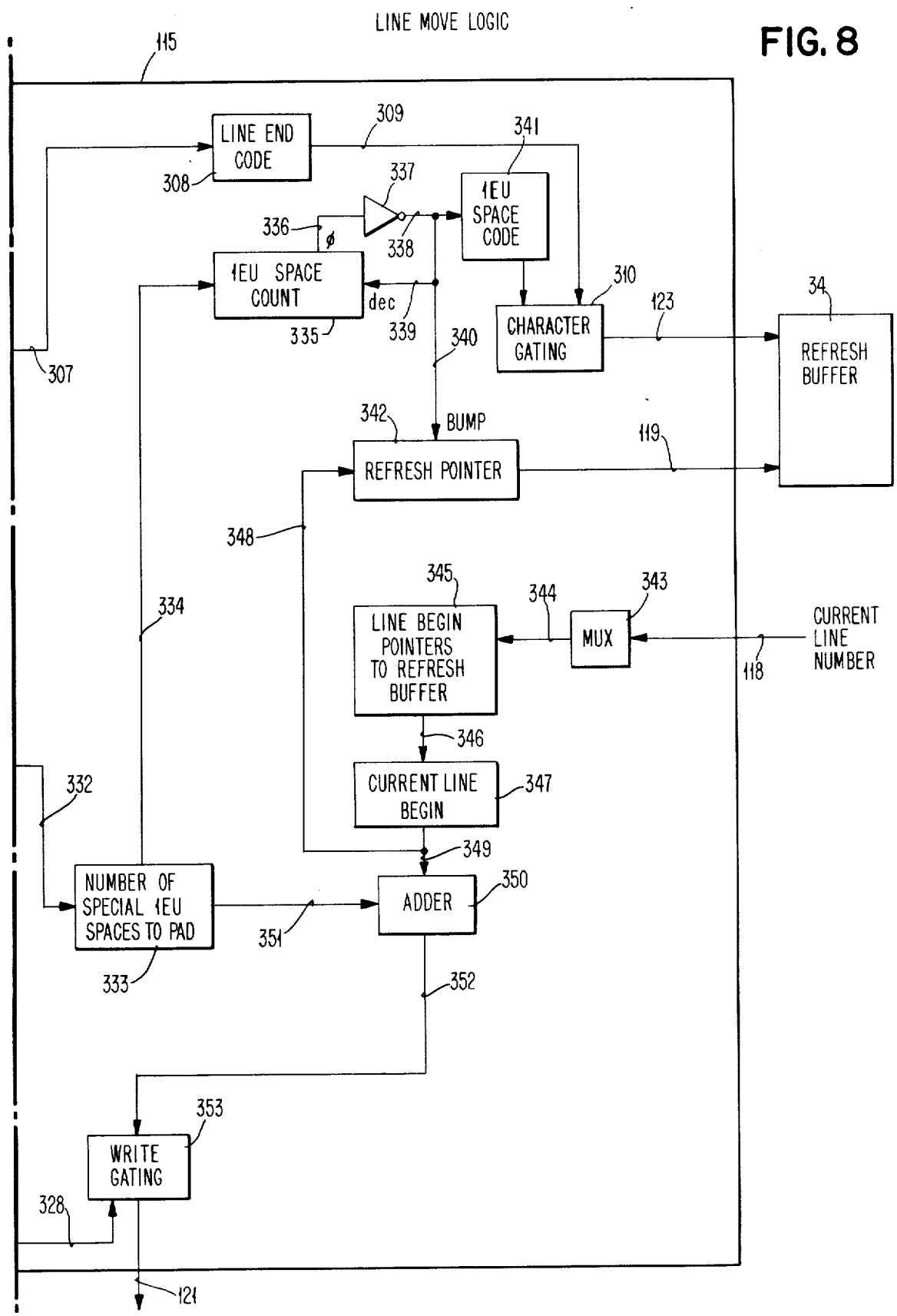

Reference is next made to FIG. 8 wherein there is shown the structure included in the line move logic block 115 of FIG. 4. In general, the purpose of this block is to read a segment stored in intermediate buffer 24 and write it in an appropriate location in the refresh buffer 34. If the segment being worked on is to the right of the first segment and operation is in proportional spacing (PSM) the chances are that a character will overlap the left edge of the segment. In effect, there will be a partial character at the beginning of the segment. In this case, there is to be a space fill-in at the beginning of the segment for the partial character. This space fill-in is in the refresh buffer and up to the point of the first whole character in the segment.

Following the loading and formatting of a line of character codes in the intermediate buffer 24, the reading of the line begins with the first character code. This line is the current line. The first character code location is determined by current buffer location counter 303 which is reset along line 304 at the beginning of operation. This controls the address pointer 117. As pointer 117 addresses each character code, the addressed code is output along line 116 to current data register 300. The output of current data register 300 is along line 301 to compare unit 302. This output is also applied along line 22 to escapement ROS 21 for determining escapement. The escapement output of escapement ROS 21 is along line 23 to current character escapement register 311. The output of current character escapement register 311 is along line 312 to adder 313. The other input to adder 313 is along line 316 from current total escapement register 315. If the first character has just been read out of buffer 24, a zero will be applied along line 316. The sum in adder 313 is then applied along line 314 for storage in current total escapement register 315. Register 315 will thus contain the escapement unit count from the beginning of buffer 24.

It is to be noted that adder 313 is similar to adder 55 in FIG. 4. That is, it is sequential rather than combinational in nature. The output along line 314 is not updated until clocked by an input along line 550 from AND gate 551. The inputs to AND gate 551 are adder clock along line 501 and character bump along line 128. The adder clock input along line 501 is from adder clock 500 in FIG. 4. Until an updated input is applied along line 550, there is no output along line 314. Adder 313 will continue to accumulate escapement counts as each character code is applied along line 116.

The output of current total escapement register 315 is applied along line 317 to divider 318 wherein it is divided by the constant stored in constant register 324. The output of register 324 is applied along line 325. The constant C1 stored in register 324 is 5 escapement units. The whole number output of divider 318 is along line 319 to current total character count register 320. A character count is stored in register 320. The whole number stored in register 320 is applied along line 326 to compare unit 327. The other input to compare unit 327 is the current segment begin count along line 114. When there is a comparison between the count of characters read out of the intermediate buffer 24 and the count of characters corresponding to the current segment begin point, an output is applied along line 328 to AND gate 361, AND gate 360, and AND gate 353. The output from compare unit 327 is also applied along line 329 to inverter 330. The output from inverter 330 is along line 331 causing the address pointer 117 to cease incrementing. The pointer 117 is now addressing the first character which is to be transferred to the refresh buffer. The address of pointer 117 is applied along line 354 to AND gate 361 and then along line 122 to DMA 26. The address of pointer 117 is also applied along line 355 to adder 358. The other input to added 358 is the length of the line stored in the refresh buffer 34. This is applied along line 357. The sum output from adder 358 along line 359 is the address in the intermediate buffer where readng is to stop. A segment has now been determined. The sum applied along line 359 is to AND gate 360 and then along line 120 to DMA 26.

The remainder from divider 318 is applied along line 321 to subtractor 322. The remainder is subtracted from the constant C1 stored in register 324 and applied along line 323. The output of subtracter 322 is the width in escapement units of a partial character adjacent the left edge of the segment. The number of escapement units output from subtractor 322 is applied along line 332 to number of special one escapement unit spaces to pad register 333. The number of special one escapement unit spaces is then applied along line 334 to one escapement unit space count counter 335. The output of one escapement unit space count counter 335 is applied along line 336 to inverter 337. As a count for each space is output from counter 335, an up signal is applied along line 338 for storing a code in one escapement unit space code register 341. The output of inverter 337 is also applied along line 339 to cause counter 335 to decrement. When one escapement unit space count counter 335 has been decremented to zero, the loading of register 341 ceases. At this time, each one escapement unit space code has been gated through OR gate 310, and along line 123 for storage in refresh buffer 34. An up output along line 338 is also applied along line 340 to bump or increment refresh buffer pointer 342. Refresh pointer 342 addresses refresh buffer 34 along line 119. There has now been a space fill-in in refresh buffer 34 for the partial character at the beginning of the segment.

The initial position of pointer 342 for addressing the beginning of the line stored in the refresh buffer 34 was determined by an input of the current line number along line 118. The current line number applied along line 118 is applied to multiplexer 343. The output of multiplexer 343 is along line 344 to line begin pointers to refresh buffer register 345. The output of register 345 is along line 346 to current line begin register 347. The output of current line begin register 347 is along line 348 to refresh pointer 342. The output of current line begin register 347 is also along line 349 to adder 350. The other input to adder 350 is along line 351 from the number of special one escapement unit spaces to pad register 333. The sum output from adder 350 is along line 352 to AND gate 353. The output of AND gate 353 is along line 121 to DMA 26. This will determine the point DMA 26 is to begin writing the segment into refresh buffer 34. The writing of the segment will begin with the first whole character.

After a line end code is read and applied along line 116 to current data unit 300, it is output along line 301 to compare 302. The other input to compare 302 is a line end code from register 306 along line 305. Upon a compare, an output is applied along line 307 to line end code register 308. The line end code is then gated along line 309 to OR gate 310. The output of OR gate 310 is applied along line 123 to refresh buffer 34. This serves two purposes. The first is that there is no text in the segment, the storing of a line end code will result in the display of a blank line. The other is if a segment is not complete due to the line ending before the end of the segment, the operation will be complete.

Tab Logic

Figure 9:
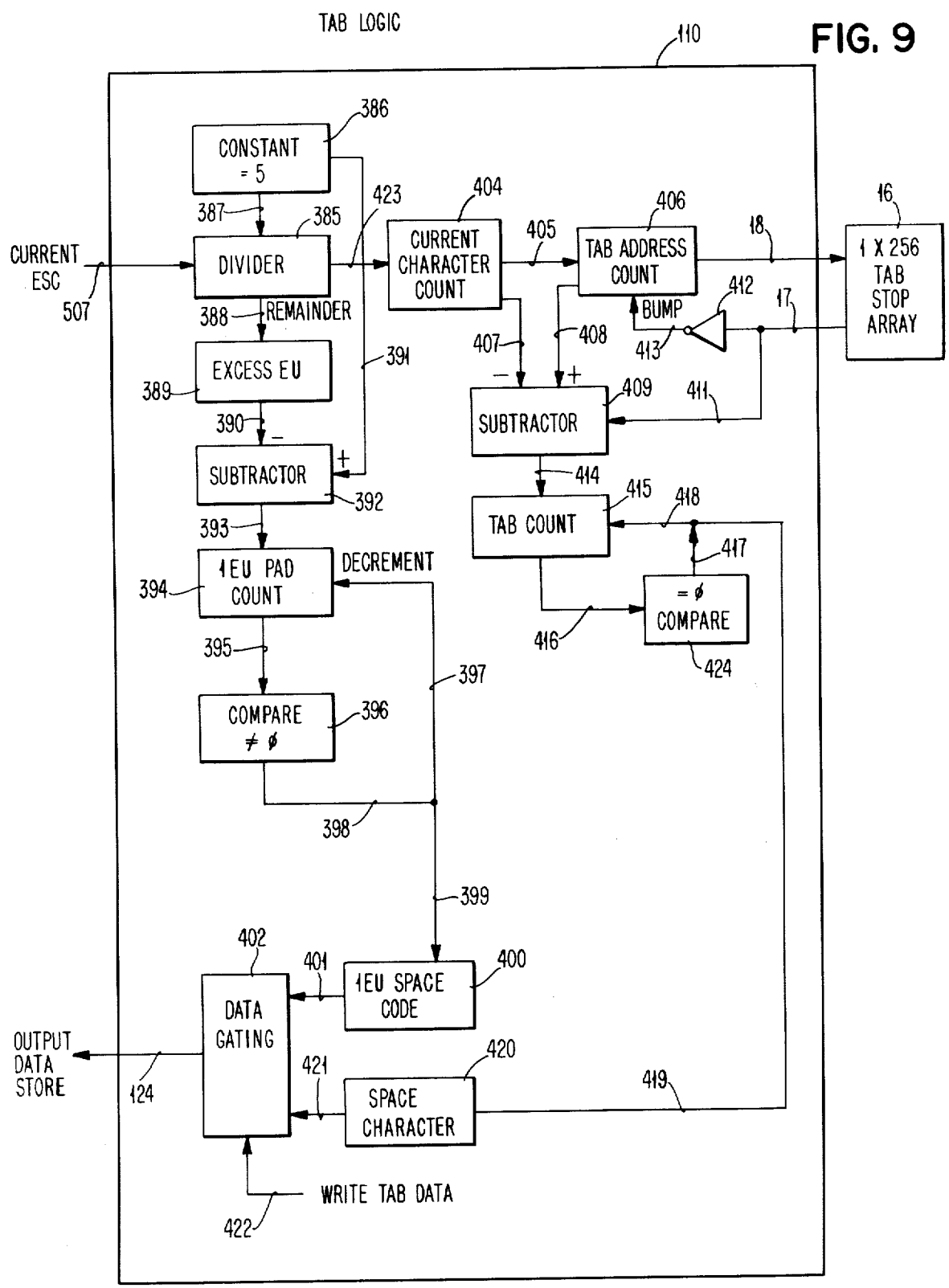
FIG. 9 illustrates the structure included in the tab logic block of FIG. 4.

Reference is next made to FIG. 9 wherein there is shown the structure included in the tab logic block 110 of FIG. 4.

During the readout of character and control codes from the text storage buffer 2, a tab code can be read. This is not to be input to the intermediate buffer 24. Instead, a number of spaces equivalent to the tab length are to be stored in the intermediate buffer 24. When a tab is read, the count in the current total escapement register 57 (FIG. 4) will include the count for all characters and spaces including the tab. The tab length is obtained from tap stop array 16. The count in register 57 is applied along line 507 to divider 385. Another input to divider 385 is a constant along line 387 from register 386. If there is a remainder, its escapement unit count is applied along line 388 to excess escapement unit register 389. The count contained in register 389 is applied along line 390 to subtractor 392 where it is subtracted from the constant 5 stored in register 386. The output from register 386 to subtractor 392 is along line 391. The output of subtractor 392 is then applied along line 393 to one escapement unit pad count counter 394. The count loaded into counter 394 is the number of one escapement unit spaces, in addition to normal spaces, required to fill in the intermediate buffer 24 for the tab. This count is applied to compare unit 396 along line 395. One escapement unit space counts will be output along line 397 and counter 394 will be decremented as long as the output of compare 396 is not zero. The compare output along line 398 and the one escapement unit count are applied along line 399 to one escapement unit space code encoder 400. Each time counter 394 is decremented, a one escapement space is output to AND gate 402. The codes output from encoder 400 are applied along line 401 to AND gate 402. Upon the application of a write tab data signal along line 422 (which is equivalent to line 74 in FIG. 4), one escapement unit space codes are applied along line 124 to output data store 70.

The total current escapement for character and spaces along line 507 is applied to divider 385 and divided by the constant 5 stored in register 386. The whole number output is applied along line 423 to current character count register 404. The count stored in register 404 is applied along line 405 to tab address countpointer 406. This addresses the tab stop array 16 along line 18. This address is the point where normal spaces are to begin being output to buffer 24. Another output of current character count 404 is along line 407 to subtractor 409. The remaining input to subtractor 409 is along line 408 from tab address count 406. The output of tab address count 406 is along line 18 for addressing tab stop array 16. This is for determining the location of the next set tab for determining the number of spaces to be stored in the intermediate buffer. An output is applied from the tab stop array 16 along line 17 to inverter 412. The output of inverter 412 is along line 413 for incrementing tab address count 406. The difference between the current character count 404 and the tab address count 406 is thus the count for the number of spaces to be written into buffer 24 for a tab. This is calculated by subtractor 409. The inputs to subtractor 409 are along line 407 and line 408. The output from tab stop array 16 is also applied along line 411 to subtractor 409. The output of subtractor 409 is along line 414 to tab count register 415. The output of tab count register 415 is along line 416 to compare unit 424. In compare unit 424, there is a compare to zero. The output of compare 424 is applied along line 417. When the output is a one, an output is applied along line 419 to space register 420. Space register 420 is loaded with a space character. The output of space register 420 is applied along line 421 to AND gate 402. Upon the application of a write tab data signal along line 422 the space character is gated out along line 124 to the output data store. This process continues until tab count 415 equals zero. At this point the correct number of spaces have been output to the intermediate buffer 24.

In summary, a system is provided which effects the automatic segmentation of both text lines and scale line which are to be displayed. Segmentation is dependent upon the location of a cursor in one of the lines of the text. The system is structured to handle both standard and proportional width characters. Each line beginning with the line containing the cursor is sequentially loaded into a line buffer. Following the loading of the first line, a segment including the cursor is selected. This segment is loaded into a refresh buffer for display. Then the corresponding segment of each following line, including the scale line, is determined and loaded into the refresh buffer for display. Upon repositioning of the cursor beyond either the left or right edge of the display, the above operation is repeated beginning with the loading of the cursor line into the line buffer. The occurrence of a partial character adjacent the left edge of a segment will result in a space fill-in for display. Thus, each line is displayed beginning with whole characters.

While the invention has been particularly shown and described with reference to a preferred embodiment, it will be understood by those skilled in the art the various changes in form and detail may be made without departing from the spirit and scope of the invention.

What is claimed is:

1. In a system for displaying information such as a number of lines of characters, symbols, etc., in horizontal segments, due to a measure, which is the distance between a left and a right margin, for said information being wider than the width of a display included in said system, the improvement comprising in combination:
   (a) means for selecting an operating mode for said system including a proportional spacing mode;
   (b) means when operating in said proportional spacing mode for horizontally segmenting said information to obtain, for display, a horizontal segment of said information having a beginning following and not including a beginning of said measure and made up of a segment of each of said lines with each horizontal segment beginning with each whole character, symbol, etc., following (1) said beginning of said horizontal segement and (2) any character, symbol, etc., which overlaps said beginning of said horizontal segment to be displayed; and
   (c) means for separately displaying said horizontal segment of said information.

2. A system according to claim 1 including means for defining an operating point in one of said lines of said horizontal segment which is obtained by said means for horizontally segmenting said information.

3. A system according to claim 2:
   (a) including a first storage means for storing said information to be segmented by said means for horizontally segmenting said information; a second storage means for storing one of said lines of said information to be segmented by said means for horizontally segmenting said information; and means for sequentially transferring said lines of said information beginning with said line having said operating point defined therein from said first storage means to said second storage means;
   (b) wherein said means for horizontally segmenting said information includes means for determining a segment;
   (c) including a third storage means for storing said segment determined by said means for determining a segment;
   (d) wherein said means for horizontally segmenting said information includes means for transferring said segment to said third storage means; and
   (e) including a fourth storage means for storing a scale line for said information to be segmented by said means for horizontally segmenting said information.

4. A system according to claim 3 wherein said means for sequentially transferring said lines to said second storage means includes means for transferring said scale line from said fourth storage means to said second storage means.

5. A system according to claim 4 wherein said means for determining a segment includes means for determinig corresponding segments of lines, including said scale line, following said line having said operating point defined therein.

6. A system according to claim 5 wherein said means for transferring said segment to said third storage means includes means for transferring said corresponding segments to said third storage means.

7. A system according to claim 6 wherein said display means includes means for displaying said segment and said corresponding segments.

8. A system according to claim 7 including means for causing said scale line segment to be displayed in standard spacing.

9. A system according to claim 8 wherein said mode selection means includes means for selecting a standard spacing mode.

10. A system according to claim 2 wherein said display means includes means for displaying said horizontal segment of said information containing said operating point adjacent a left edge of said display.

11. A system for horizontally scrolling information, such as a number of lines of characters, symbols, etc., by segments for display, said lines extending between a left and a right margin, said system comprising:
(a) means for selecting an operating mode for said system including a proportional spacing mode;
(b) means for defining a plurality of horizontal segments of said information between said left and right margins;
(c) means, when operating in said proportional spacing mode, for obtaining said segments of said information made up of a segment of each of said lines with each segment beginning with each whole character, symbol, etc., following any character, symbol, etc., which overlaps a beginning of said segments; and
(d) means for separately displaying each of said segments of said information for horizontally scrolling said information.

12. A system according to claim 11 including means for causing a space fill-in for a character, symbol, etc., overlapping a beginning of one of said horizontal segments.

13. A system according to claim 12 including means for defining an operating point in said information.

14. A system according to claim 13 wherein said means for obtaining said segments of said information includes means for obtaining a segment including said operating point.

15. A system according to claim 14 wherein said segment defining means includes means for defining said segments extending from said left margin.

16. A system according to claim 15 wherein said display means includes means for displaying said segments adjacent a left edge of said display.

* * * * *